US007016835B2

(12) United States Patent
Eide et al.

(10) Patent No.: US 7,016,835 B2
(45) Date of Patent: Mar. 21, 2006

(54) SPEECH AND SIGNAL DIGITIZATION BY USING RECOGNITION METRICS TO SELECT FROM MULTIPLE TECHNIQUES

(75) Inventors: Ellen Marie Eide, Mount Kisco, NY (US); Ramesh Ambat Gopinath, Millwood, NY (US); Dimitri Kanevsky, Ossining, NY (US); Peder Andreas Olsen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/323,549

(22) Filed: Dec. 19, 2002

(65) Prior Publication Data

US 2003/0115053 A1   Jun. 19, 2003

Related U.S. Application Data

(63) Continuation of application No. 09/431,561, filed on Oct. 29, 1999, now abandoned.

(51) Int. Cl.
*G10L 15/00* (2006.01)

(52) U.S. Cl. ...................................... 704/231; 704/236
(58) Field of Classification Search ........ 704/229–233, 704/238–256, 271–275, 235, 236, 270; 382/229; 345/156; 341/50; 356/406; 379/406.08, 379/388.04
See application file for complete search history.

(56) References Cited

U.S. PATENT DOCUMENTS

| | | | | |
|---|---|---|---|---|
| 4,654,875 | A | * | 3/1987 | Srihari et al. ................ 382/229 |
| 4,763,278 | A | * | 8/1988 | Rajasekaran et al. ........ 704/251 |
| 4,994,983 | A | * | 2/1991 | Landell et al. .............. 704/245 |
| 5,157,384 | A | * | 10/1992 | Greanias et al. ............ 345/156 |

(Continued)

FOREIGN PATENT DOCUMENTS

JP        08-248988    *    9/1996

(Continued)

OTHER PUBLICATIONS

Fiscus (A Post-Processing System To Yield Reduced Word Error Rates: Recognizer Output Voting Error Reduction (ROVER) IEEE Workshop on Automatic Speech Recognition and Understanding, Dec. 1997).*

(Continued)

*Primary Examiner*—Angela Armstrong (57) ABSTRACT

A characteristic-specific digitization method and apparatus are disclosed that reduces the error rate in converting input information into a computer-readable format. The input information is analyzed and subsets of the input information are classified according to whether the input information exhibits a specific physical parameter affecting recognition accuracy. If the input information exhibits the specific physical parameter affecting recognition accuracy, the characteristic-specific digitization system recognizes the input information using a characteristic-specific recognizer that demonstrates improved performance for the given physical parameter. If the input information does not exhibit the specific physical parameter affecting recognition accuracy, the characteristic-specific digitization system recognizes the input information using a general recognizer that performs well for typical input information. In one implementation, input speech having very low recognition accuracy as a result of a physical speech characteristic is automatically identified and recognized using a characteristic-specific speech recognizer.

30 Claims, 5 Drawing Sheets

U.S. PATENT DOCUMENTS

| | | | |
|---|---|---|---|
| 5,298,674 A * | 3/1994 | Yun | 704/233 |
| 5,319,736 A * | 6/1994 | Hunt | 704/227 |
| 5,586,180 A * | 12/1996 | Degenhardt et al. | 379/388.04 |
| 5,687,288 A * | 11/1997 | Dobler et al. | 704/255 |
| 5,712,957 A * | 1/1998 | Waibel et al. | 704/240 |
| 5,729,655 A | 3/1998 | Kolesnik et al. | 704/219 |
| 5,751,903 A | 5/1998 | Swaminathan et al. | 704/219 |
| 5,758,002 A * | 5/1998 | Trompf et al. | 704/232 |
| 5,774,857 A * | 6/1998 | Newlin | 704/271 |
| 5,774,858 A * | 6/1998 | Taubkin et al. | 704/273 |
| 5,835,607 A * | 11/1998 | Martin et al. | 379/406.08 |
| 5,842,168 A * | 11/1998 | Miyazawa et al. | 704/275 |
| 5,864,804 A * | 1/1999 | Kalveram | 704/233 |
| 5,960,397 A * | 9/1999 | Rahim | 704/244 |
| 6,044,344 A * | 3/2000 | Kanevsky | 704/244 |
| 6,058,359 A * | 5/2000 | Hagen et al. | 704/214 |
| 6,067,517 A * | 5/2000 | Bahl et al. | 704/256 |
| 6,073,097 A * | 6/2000 | Gould et al. | 704/251 |
| 6,104,321 A * | 8/2000 | Akagiri | 341/50 |
| 6,122,613 A * | 9/2000 | Baker | 704/235 |
| 6,151,576 A * | 11/2000 | Warnock et al. | 704/239 |
| 6,233,553 B1 * | 5/2001 | Contolini et al. | 704/220 |
| 6,233,559 B1 * | 5/2001 | Balakrishnan | 704/275 |
| 6,243,713 B1 * | 6/2001 | Nelson et al. | 704/231 |
| 6,285,786 B1 * | 9/2001 | Seni et al. | 382/187 |
| 6,345,252 B1 * | 2/2002 | Beigi et al. | 704/251 |
| 6,535,287 B1 * | 3/2003 | Matsui et al. | 356/406 |
| 6,618,702 B1 * | 9/2003 | Kohler et al. | 704/250 |
| 2003/0004714 A1 * | 1/2003 | Kanevsky et al. | 704/231 |

FOREIGN PATENT DOCUMENTS

| | | | |
|---|---|---|---|
| JP | 10-164638 | * | 6/1998 |
| JP | 2001-356790 | * | 12/2001 |

OTHER PUBLICATIONS

Siegler, M.A., "Measuring and Compensating for the Effects of Speech Rate in Large Vocabulary Continuous Speech Recognition," Carnegie Mellon University (Dec. 1995).

Nalwa, V.S., "Automatic On-Line Signature Verification," Proceedings of IEEE, 215-239 (Feb. 1997).

Bahl et al., "A Method for the Construction of Acoustic Markov Models for Words," RC 13099 (#58580) Computer Science, 13 pages (Sep. 1987).

* cited by examiner

SPEECH AND SIGNAL DIGITIZATION BY USING RECOGNITION METRICS TO SELECT FROM MULTIPLE TECHNIQUES

CROSS REFERENCE TO RELATED APPLICATIONS

This application is a continuation of U.S. application Ser. No. 09/431,561, filed Oct. 29, 1999 now abandoned.

FIELD OF THE INVENTION

The present invention relates generally to digitization systems, such as speech recognition systems, that convert information into a computer-readable format and, more particularly, to methods and apparatus for improving digitization techniques using characteristic-specific recognizers for portions of the input information that exhibit certain characteristics, such as fast speech for a speech recognition system.

BACKGROUND OF THE INVENTION

A number of digitization techniques have been developed to convert input information into a computer-readable format. Automatic speech recognition (ASR) systems, for example, convert speech into text. In addition, optical character recognition (OCR) systems and automatic handwriting recognition (AHR) systems convert the textual portions of a document into a computer-readable format. In each case, the input information, such as speech segments or character segments, are recognized as strings of words or characters in some computer-readable format, such as ASCII.

Generally, a speech recognition engine, such as the ViaVoice™ speech recognition system, commercially available from IBM Corporation of Armonk, N.Y., generates a textual transcript using a combination of acoustic and language model scores to determine the best word or phrase for each portion of the input audio stream. Speech recognition systems are typically guided by three components, namely, a vocabulary, a language model and a set of pronunciations for each word in the vocabulary. A vocabulary is a set of words that is used by the recognizer to translate speech to text. As part of the recognition process, the recognizer matches the acoustics from the speech input to words in the vocabulary. Therefore, the vocabulary defines the words that can be transcribed.

A language model is a domain-specific database of sequences of words in the vocabulary. A set of probabilities of the words occurring in a specific order is also required. The output of the recognizer will be biased towards the high probability word sequences when the language model is operative. Thus, correct speech recognition is a function of whether the user speaks a sequence of words that has a high probability within the language model. Thus, when the user speaks an unusual sequence of words, the speech recognition performance will degrade. Word recognition is based entirely on its pronunciation, i.e., the phonetic representation of the word. For best accuracy, domain-specific language models must be used. The creation of such a language model requires large textual corpuses to compute probabilities of word histories. The quality of a language model can vary greatly depending, for example, on how well the training corpus fits the domain in which the speech recognition is performed, and the size of the training corpus.

While such domain-specific language models improve the accuracy of speech recognition engines, the accuracy of the transcribed text can nonetheless be degraded due to certain speech characteristics, such as fast speech, speech with background noise or speech with background music. Generally, conventional transcription processes utilize a single speech recognizer for all speech. Fast speech, however, contributes to additional errors in the transcription process. It is difficult to segment fast speech properly, since the time metrics vary for different speakers and words. Similar problems have been observed for other types of speech characteristics as well, such as speech with background noise and speech with music. For a discussion of the impact of such speech characteristics on the transcription process, see, for example, Matthew A. Singer, "Measuring and Compensating for the Effects of Speech Rate in Large Vocabulary Continuous Speech Recognition," Thesis, Carnegie Mellon University (1995), incorporated by reference herein.

Thus, if input speech has certain characteristics that may degrade the transcription process, certain words or phrases may by improperly identified. A need therefore exists for a digitization system that reduces the error rate by using recognition techniques that have improved performance for certain characteristics on subsets of the input information that exhibit such characteristics.

SUMMARY OF THE INVENTION

Generally, a characteristic-specific digitization method and apparatus are disclosed that reduce the error rate in converting input information, such as speech, handwriting or printed text, into a computer-readable format. According to one aspect of the invention, the characteristic-specific digitization system analyzes the input information and classifies subsets of the input information according to whether or not the input information exhibits a specific physical parameter that affects recognition accuracy. If the input information exhibits the specific physical parameter affecting recognition accuracy, the characteristic-specific digitization system recognizes the input information using a characteristic-specific recognizer that demonstrates improved performance for the given physical parameter. If the input information does not exhibit the specific physical parameter affecting recognition accuracy, the characteristic-specific digitization system recognizes the input information using a general recognizer that performs well for typical input information.

In an illustrative automatic speech recognition (ASR) system, the recognition of the input speech may be impaired by physical parameters such as fast speech, speech with background noise, speech with background music, as well as the gender and accent of a given speaker. The present invention automatically identifies and recognizes input speech having very low speech recognition accuracy as a result of a physical speech characteristic, using a character-istic-specific speech recognizer that demonstrates improved performance for the given speech characteristic.

The present invention analyzes the speech being processed and classifies each speech phrase according to whether or not the speech phrase exhibits the physical parameter. For example, the present invention can classify input speech as fast speech or normal-rate speech. Once classified, the speech may be recognized using a general or characteristic-specific speech recognizer, as appropriate.

In one implementation, the characteristic-specific speech recognition system of the present invention utilizes a plurality of prioritized speech recognition methods that exhibit varying degrees of improved speech recognition for a certain characteristic of the input speech. The input information is recognized in parallel using each of the prioritized speech recognition methods and the best performing speech recognizer is selected for each phrase. In one embodiment, the characteristic-specific speech recognition system utilizes three prioritized speech recognition methods that improve on a given speech characteristic to varying degrees. A characteristic-specific speech recognizer exhibits the best performance for recognizing speech that contains the particular speech characteristic. If it is assumed that the input speech is primarily fast speech, the output of the characteristic-specific speech recognizer is used as the reference speech recognizer Thus, if the output of an intermediate speech recognizer more closely matches the output of the characteristic-specific speech recognizer than the output of a general speech recognizer matches the output of the characteristic-specific speech recognizer, then the input speech phrases are classified as fast speech.

The portions of the input speech that are not classified as fast speech can be recognized by the general speech recognizer. Likewise, the portions of the input speech that are classified as fast speech can be recognized using the characteristic-specific speech recognizer to improve the speech recognition accuracy.

A more complete understanding of the present invention, as well as further features and advantages of the present invention, will be obtained by reference to the following detailed description and drawings.

DETAILED DESCRIPTION OF PREFERRED EMBODIMENTS

Figure 1:
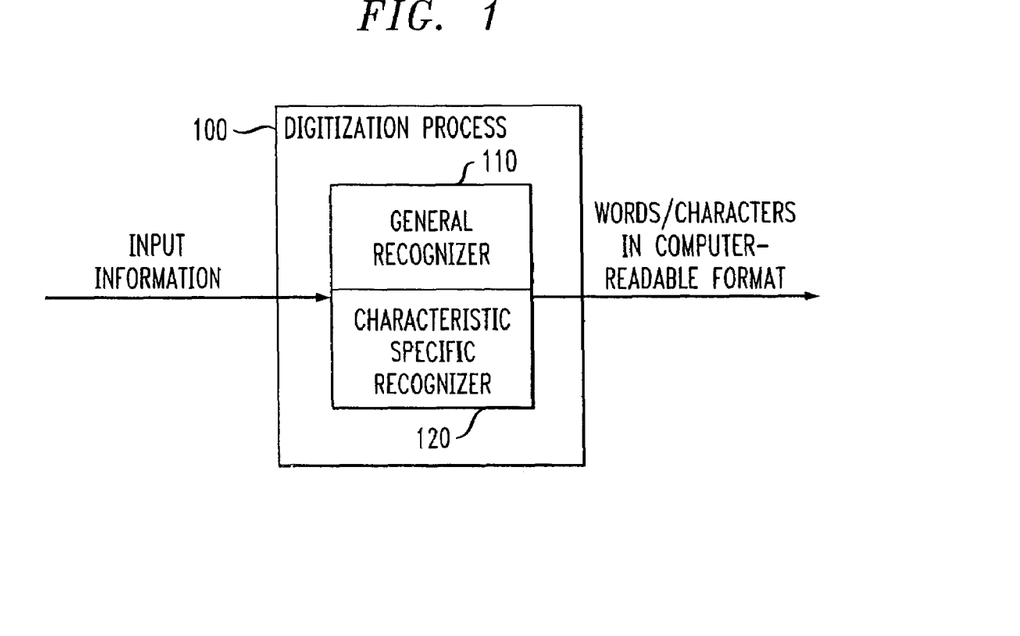
FIG. 1 is a schematic block diagram of a characteristic-specific digitization system according to the present invention.

A characteristic-specific digitization system 100 according to the present invention is shown in FIG. 1. The characteristic-specific digitization system 100 converts input information into words or characters in a computer-readable format. The input information may be, for example, speech, handwriting, printed text, pictures or text in some language. Likewise, the characteristic-specific digitization system 100 may utilize an automatic speech recognition (ASR) system, an automatic handwriting recognition (AHR) system, an optical character recognition (OCR) system, an object recognition system or a machine translation (MT) system.

According to one feature of the present invention, the characteristic-specific digitization system 100 analyzes the input information and classifies subsets of the input information according to whether or not the input information exhibits a specific physical parameter that affects recognition accuracy. If the input information exhibits the specific physical parameter affecting recognition accuracy, the characteristic-specific digitization system 100 recognizes the input information using a characteristic-specific recognizer 120 that demonstrates improved performance for the given physical parameter. If the input information does not exhibit the specific physical parameter affecting recognition accuracy, the characteristic-specific digitization system 100 recognizes the input information using a general recognizer 110 that performs well for typical input information.

While the present invention is illustrated primarily in the context of an automatic speech recognition system, the present invention applies to any digitization system that converts input information having some physical parameter that affects speech recognition accuracy into a computer-readable format, as would be apparent to a person of ordinary skill in the art. In an automatic speech recognition (ASR) system, the speech recognition of the input speech may be impaired by physical parameters such as fast speech, speech with background noise, speech with background music, as well as the gender and accent of a given speaker.

According to one feature of the present invention, input speech having very low speech recognition accuracy as a result of some physical speech characteristic is automatically identified and recognized using a characteristic-specific speech recognizer that demonstrates improved performance for a given speech characteristic, such as fast speech, speech with background noise or speech with music. Thus, the present invention provides improved speech recognition accuracy for the input information.

The present invention addresses some physical parameter that characterizes speech and that affects the speech recognition accuracy, such as fast speech. In one embodiment, the present invention analyzes the speech being processed and classifies each speech phrase according to whether or not the speech phrase exhibits the physical parameter. For example, the present invention can classify input speech as fast speech or normal-rate speech and thereafter apply the appropriate general or characteristic-specific speech recognizer.

Figure 2:
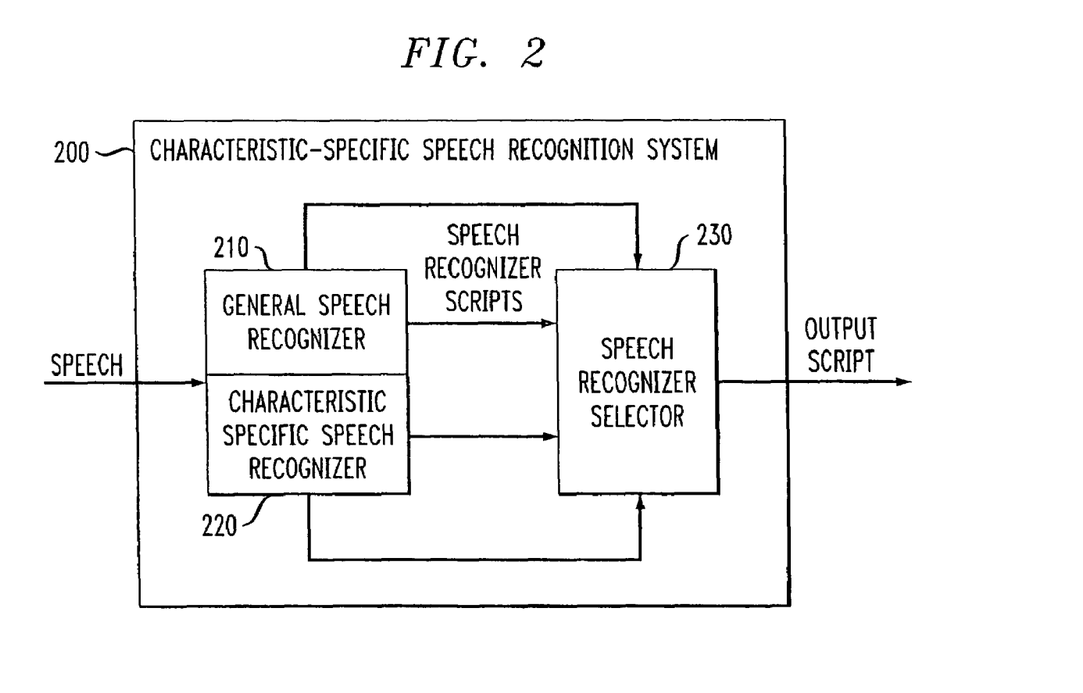
FIG. 2 illustrates the characteristic-specific digitization system of FIG. 1 in further detail.

In one illustrative implementation of a speech recognition system in accordance with the present invention, shown in FIG. 2, the characteristic-specific speech recognition system 200 utilizes a plurality of prioritized speech recognition methods 210, 220 that exhibit varying degrees of improved speech recognition for a certain characteristic of the input speech. The input information is recognized in parallel using each of the prioritized speech recognition methods 210, 220. Thereafter, the best performing speech recognizer is selected by a speech recognizer selector 230 for each phrase. As discussed further below, the best performing speech recognizer for each phrase may be selected by the selector 230, for example, by comparing each recognized phrase to the output of a reference speech recognizer or by using an external selection method that, for example, evaluates a change in energy to identify fast speech. It is noted that following selection by the speech recognizer selector 230, the corresponding selected recognized output can be utilized as the transcribed phrase directly, or the phrasei can be recognized again by the appropriate speech recognizer, as discussed in conjunction with FIG. 3.

Figure 3:
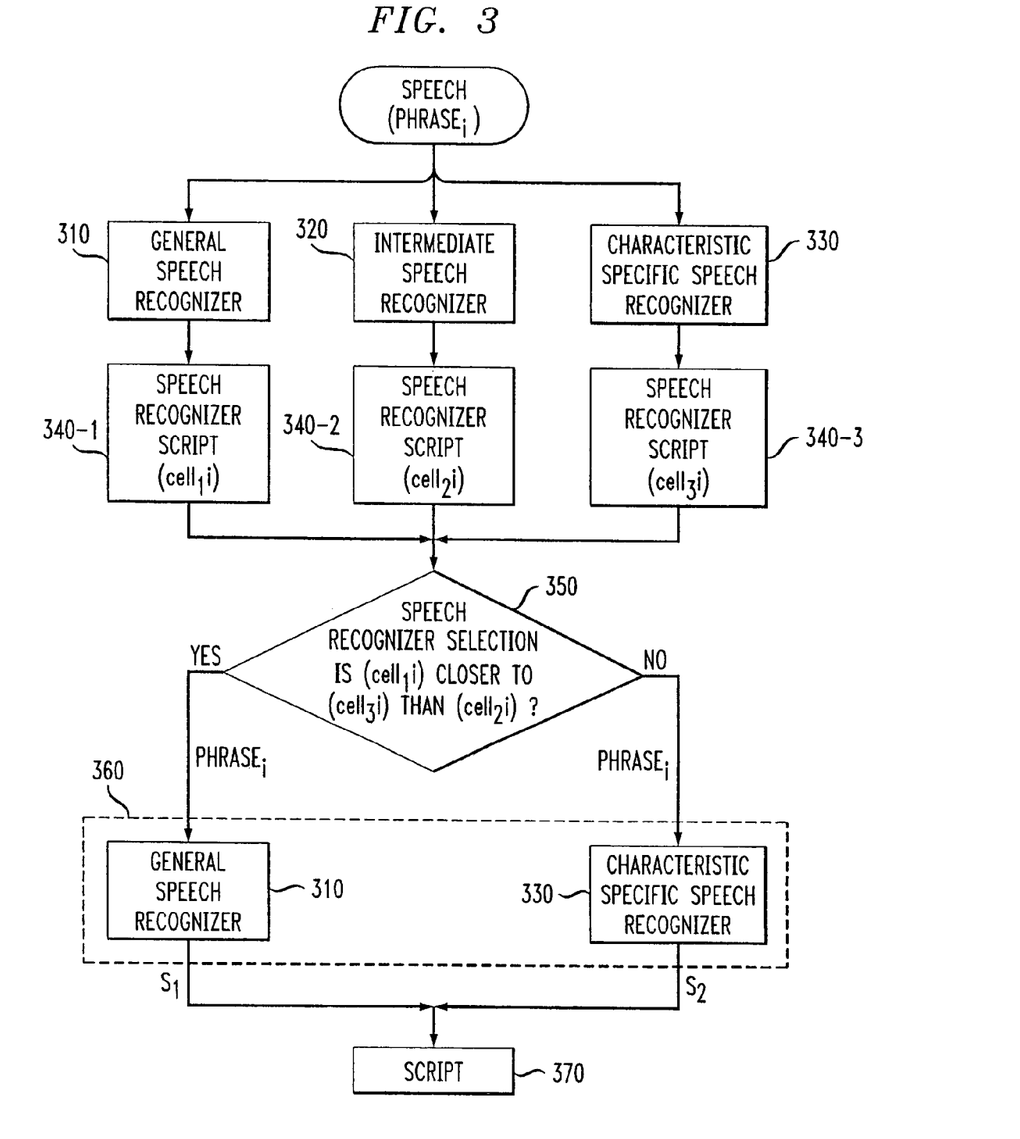
FIG. 3 is a schematic block diagram of an illustrative characteristic-specific speech recognition system implementation of the present invention.

FIG. 3 shows an illustrative selection technique in further detail. As shown in FIG. 3, the characteristic-specific speech recognition system 300 utilizes three prioritized speech recognition methods 310, 320, 330 that improve on a given speech characteristic to varying degrees. The first speech recognizer 310 is a general speech recognizer, the second speech recognizer 320 is an intermediate speech recognizer, and the third speech recognizer 330 is a characteristic-specific speech recognizer exhibiting the best performance for recognizing speech that contains the particular speech characteristic. Thus, the characteristic-specific speech recognizer 330 should perform better than speech recognizers 310, 320 on the specific speech characteristic of interest, such as fast speech. The intermediate speech recognizer 320 should perform better than speech recognizer 310 on the same specific speech characteristic of interest, such as fast speech. Finally, the general speech recognizer 310 should perform better than the speech recognizers 320, 330 on typical speech that is not characterized by the specific speech characteristic of interest. For example, the general speech recognizer 310 may be embodied as a baseline speech recognizer, the intermediate speech recognizer 320 may be embodied as a modified hidden Markov model (HMM) phone topology, and the characteristic-specific speech recognizer 330 may be embodied as a modified hidden Markov model (HMM) phone topology with a modified frame rate for the front speech end. For a discussion of hidden Markov model (HMM) phone topology, see, for example, Lalit R. Bahl et al., "Method for Construction of Acoustic Markov Models for Words," IBM Research Report RC 13099, Yorktown Heights, N.Y. (#58580) (Sep. 3, 1987), incorporated by reference herein.

In the illustrative implementation shown in FIG. 3, the characteristic-specific speech recognition system 300 assumes that the input speech is primarily fast speech and uses the output of the characteristic-specific speech recognizer 330 as the reference speech recognizer. Thus, if the output of the intermediate speech recognizer 320 more closely matches the output of the characteristic-specific speech recognizer 330 than the output of the general speech recognizer 310 matches the output of the characteristic-specific speech recognizer 330, then the input speech phrases are classified as fast speech. In other words, phrases for which the output of the intermediate speech recognizer 320 performed better than the output of the general speech recognizer 310 are labeled as fast speech. A technique for evaluating the level of similarity between the outputs of two speech recognizers is discussed below in conjunction with FIG. 4.

As shown in FIG. 3, the characteristic-specific speech recognition system 300 receives speech samples as a series of phrases, with each individual phrase being represented as phrase$_i$. The speech phrases are recognized in parallel by the three automatic speech recognition (ASR) speech recognizers 310, 320 and 330 that have been prioritized according to their performance for recognizing speech that contains the particular speech characteristic. The general speech recognizer 310 produces a speech recognition script 340-1 consisting of a plurality of cells, with each cell being represented as cell$_1$i. The intermediate speech recognizer 320 produces a speech recognition script 340-2 consisting of a plurality of cells, with each cell being represented as cell$_2$i. The characteristic-specific speech recognizer 330 produces a speech recognition script 340-3 consisting of a plurality of cells, with each cell being represented as cell$_3$i. It is again noted that the speech recognition script 340-3 is utilized as the reference script in the illustrative embodiment.

As shown in FIG. 3, an appropriate speech recognizer is selected for each phrase$_i$, at stage 350. Specifically, a comparison is performed to determine whether the output of the general speech recognizer 310, cell$_1$i, more closely matches the output of the characteristic-specific speech recognizer 330, cell$_3$i, or the output of the intermediate speech recognizer 320, cell$_2$i, more closely matches the output of the characteristic-specific speech recognizer 330, cell$_3$i. In other words, the comparison identifies the portions of the speech where the output of the characteristic-specific speech recognizer 330 and intermediate speech recognizer 320 are more similar between themselves than the corresponding portions of the output of the general speech recognizer 310 is similar with the output of the characteristic-specific speech recognizer 330. A technique for evaluating the level of similarity between the outputs of two speech recognizers is discussed below in conjunction with FIG. 4.

If it is determined at stage 350 that the output of the general speech recognizer 310, cell$_1$i, is closer to the output of the characteristic-specific speech recognizer 330, cell$_3$i, than the output of the intermediate speech recognizer 320, cell$_2$i, then the current phrase, phrase$_i$, is not fast speech and is recognized by the general speech recognizer 310. If, however, it is determined at stage 350 that the output of the general speech recognizer 310, cell$_1$i, is not closer to the output of the characteristic-specific speech recognizer 330, cell$_3$i, than the output of the intermediate speech recognizer 320, cell$_2$i, then the current phrase, phrase$_i$, is fast speech and is recognized by the characteristic-specific speech recognizer 330. It is noted that the characteristic-specific speech recognizer 330 that is applied following selection during stage 360 need not be the same characteristic-specific speech recognizer 330 that is applied for purposes of classifying the speech as fast rate or normal rate. Specifically, the characteristic-specific speech recognizer that is applied during stage 360 may demonstrate even better performance for the specific speech characteristic of interest, such as fast speech, than the characteristic-speech speech recognizer 330 applied prior to the speech recognizer selection 350. The outputs of the two speech recognizers 310, 330 are then multiplexed at stage 370 to produce the output script.

The processing of the present invention can be implemented with a single pass over the input data, as shown in FIG. 3, or in a two-stage implementation. In the two stage implementation, the speech recognizer selection stage 350 can generate two indexed lists of the speech. A first similarity index corresponds to the portions of the speech corresponding to fast speech, where the output of the characteristic-specific speech recognizer 330 and intermediate speech recognizer 320 are more similar between themselves than the corresponding portions of the output of the general speech recognizer 310. Likewise, the second complementary index corresponds to the portions of the speech corresponding to normal speech, where the output of the characteristic-specific speech recognizer 330 and intermediate speech recognizer 320 are not more similar between themselves than the corresponding portions of the output of the general speech recognizer 310. The appropriate speech recognizer 310, 330 can thereafter be applied with a second pass over the input speech using the corresponding index.

Figure 4:
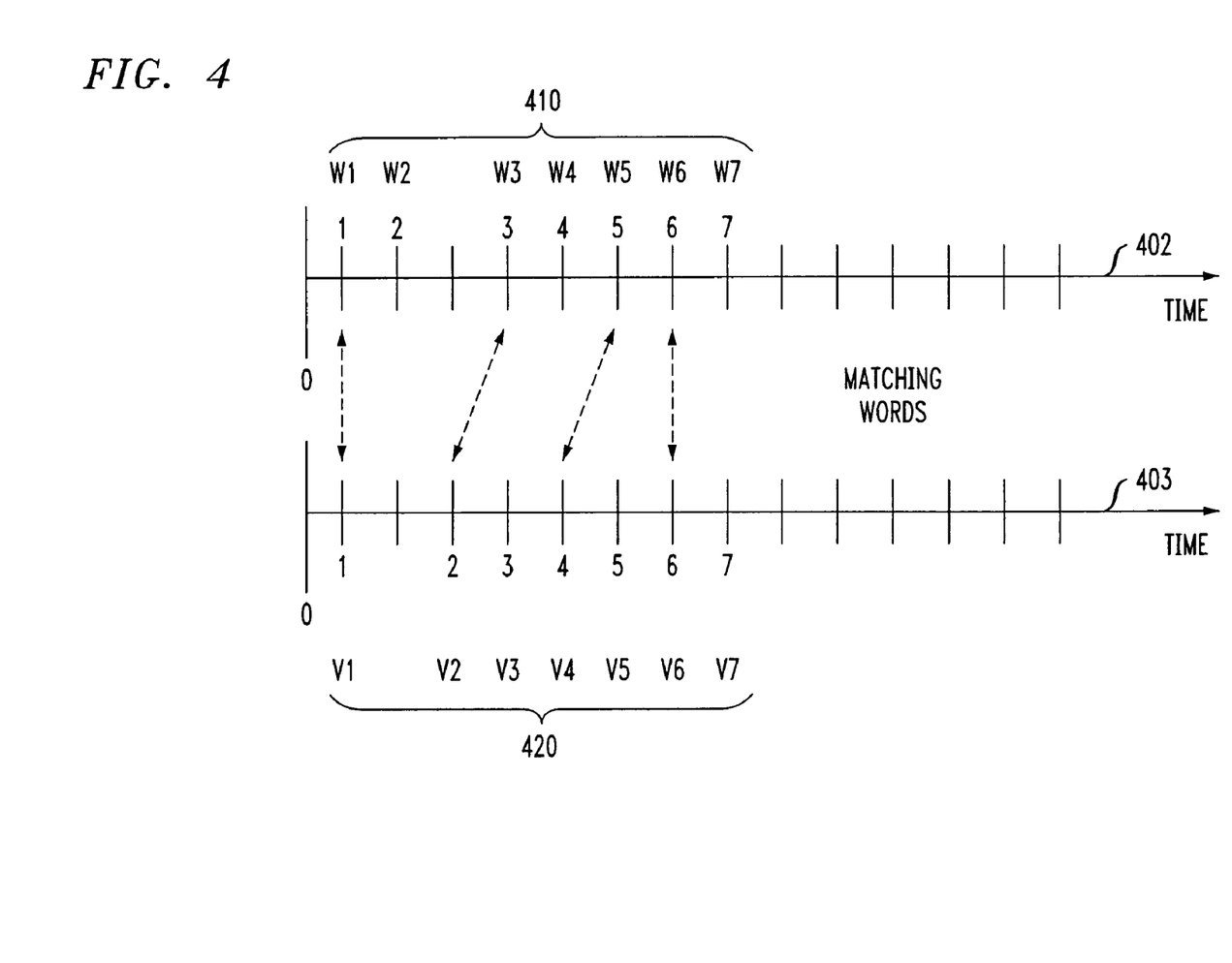
FIG. 4 illustrates a technique for evaluating the similarity between two speech recognizer outputs.

FIG. 4 illustrates the analysis that is performed on two parallel speech recognition outputs to evaluate the similarity between two speech recognition outputs, to determine which speech recognition output 340-1 or 340-2 is most similar to the reference output 340-3. In the illustrative implementation, the similarity of two strings from the scripts 340-1, 340-2 and 340-3 is measured using the number of words in one string that match the corresponding words in the another string. Thus, a larger number of matching words indicates that two strings are more similar. A voting technique counts how often the same words were produced by the different speech recognition methods to decide which words to select. In a further variation, a voting technique can be improved by weighting various speech recognition methods.

FIG. 4 illustrates an example where words are recognized from speech and time-stamped using the characteristic-specific speech recognition system 300 of FIG. 3. For example, a string of words 410 from the script 340-1 includes the words W1 through W7. Similarly, a string of words 420 from the script 340-2 includes the words V1 through V7. As shown in FIG. 4, words W1, W3, W5, W6 from the string of words 410 match words V1, V2, V4, V6 string of words 420, since these words coincide and occur in a close time proximity, as shown by time lines 402 and 403. As shown in FIG. 4, time intervals 1, 2 and 3, for example, along the time line 402 correspond to words W1, W2 and W3. Likewise, time intervals 1, 2 and 3, for example, along the time line 403 correspond to words V1, V2 and V3. The time interval 3 along time line 402 occurs close in time to the time interval 2 along time line 403, and the time interval 2 along time interval 402 does not correspond to any time interval along time line 403. Thus, the word W2 in the string of words 410 is likely an insertion, relative to the string of words 420. Similarly, the word W4 in the string of words 410 is also likely an insertion, relative to the string of words 420, since the time interval 4 along time line 402 is not close to any time interval in the time line 403.

In addition, the words W7 and V7 are compared since they occur in corresponding time intervals. Since the word W7 is not equal to the word V7, the error is attributed to substitution. In the example of FIG. 4, there are four words from the possible seven words, where the strings match between the two strings of words 410, 420. Therefore, the two strings of words 410, 420 are assigned a similarity rating of four (4), corresponding to the number of correctly matching words. Likewise, the number of mismatched words is computed as the number of deletions, insertions and substitutions. The number of mismatched words is inverse to the number of matched words. In the example of FIG. 4, the number of mismatched words is three, with two insertions and one substitution.

Figure 5:
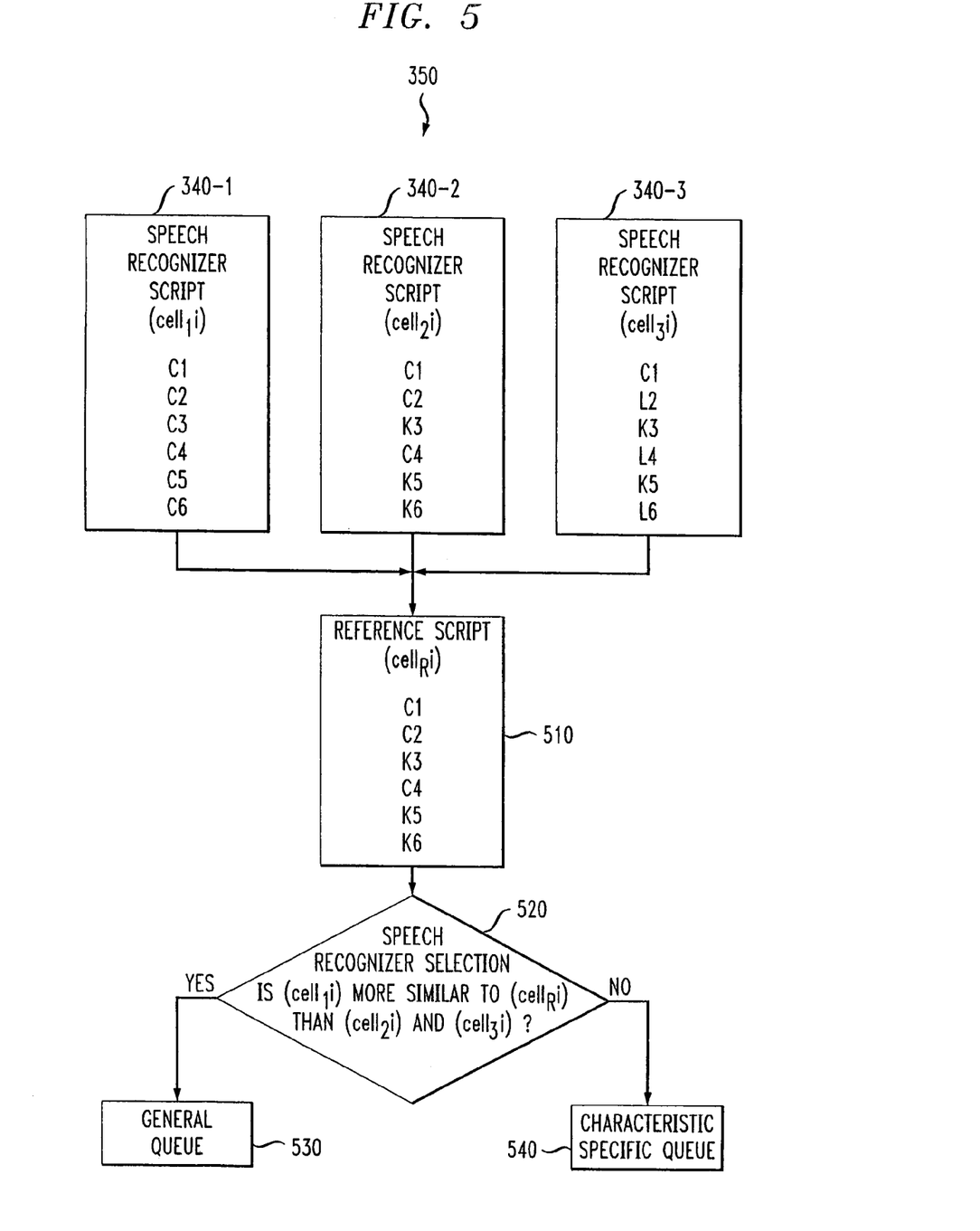
FIG. 5 illustrates an alternative implementation of the speech recognizer selection technique of FIG. 3.

FIG. 5 illustrates an alternate implementation 350' of the speech recognizer selection technique 350 discussed above in conjunction with FIG. 3. The speech recognition scripts 340-1, 340-2 and 340-3 shown in FIG. 5 correspond to the speech recognition scripts with like reference numerals from FIG. 3 and have been populated with representative cell data. In the alternate implementation of FIG. 5, a reference speech recognition script 510 is utilized as the reference speech recognition script to achieve improved speech recognition accuracy. Specifically, the reference speech recognition script 510 is obtained by comparing the corresponding cells in each of the three speech recognition scripts 340-n and counting the relative occurrences of each cell. The cell with the highest occurrence across the three speech recognition scripts 340-n is selected for the corresponding position in the reference script 510. When a reference script 510 is obtained in this manner, it is well known that the reference script 510 will demonstrate better speech recognition accuracy than the individual speech recognition scripts 340-n.

The speech recognition script 340-1 contains cells C1, C2, C3, C4 and C5. The speech recognition script 340-2 contains cells C1, C2, K3, C4 and K5. The speech recognition script 340-3 contains cells C1, C2, K3, C4 and K5. Cells in different scripts 340-n with the same index number point to the same pattern position in the input data. The speech recognition scripts 340-1, 340-2 and 340-3 have some common cells and some different cells. For example, the speech recognition scripts 340-1 and 340-2 have common cells C1, C2, C4. Likewise, the speech recognition scripts 340-2 and 340-3 have common cells C1, K3, K5.

The reference script 510 contains cells C1, C2, C4, since these cells occur in speech recognition scripts 340-1 and 340-2. In addition, the reference script 510 contains cells K3, K5, since these cells occur in speech recognition scripts 340-2 and 340-3. Finally, the reference script 510 contains cell L6, since the sixth cell in all three scripts are different and cell L6 occurs in speech recognition script 340-3 (having the highest priority).

Thus, individual cells from each of the speech recognition scripts 340-n are compared with the corresponding cell in the reference script 510, in the manner described above in conjunction with FIG. 4. A speech recognizer selection test is performed at stage 520. If a $cell_1 i$ in speech recognition script 340-1 is most similar to the cell in the reference script 510 than the corresponding cells $cell_2 i$, $cell_3 i$ in the speech recognition scripts 340-2 and 3, then $cell_1 i$ is placed in a queue 530 for general speech processing. If, however, a $cell_3 i$ in speech recognition script 340-3 is most similar to the cell in the reference script 510 than the corresponding cells $cell_1 i$, $cell_2 i$ in the speech recognition scripts 340-1 and 2, then $cell_3 i$ is placed in a queue 540 for characteristic-specific speech processing. Thereafter, the general speech recognizer 310 can be applied to the cells in the queue 530 for general speech processing. Likewise, the characteristic-specific speech recognizer 330 can be applied to the cells in the queue 540 for characteristic-specific processing.

Figure 6:
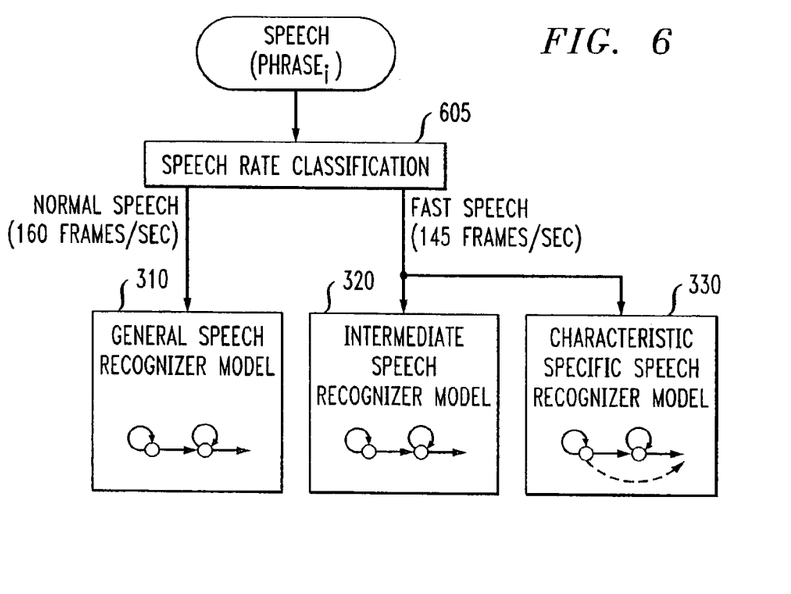
FIG. 6 illustrates hidden Markov models (HMMs) for the prioritized speech recognizers of FIG. 3.

Generally, speech rate is characterized by the frame rate or duration of phones. The shorter the duration of the phones, the faster is the speech. Speech rate can be classified by a speech rate classifier 605 based on the number of frames for a given duration. For example, as shown in FIG. 6, the string of frames for fast speech contains only 145 frames per second. Likewise, the string of frames for normal speech contains 160 frames per second.

As previously indicated, one or more of the speech recognizers 310, 320, 330 may be embodied as modified versions of hidden Markov model (HMM) phone topologies, discussed in Lalit R. Bahl et al., "Method for Construction of Acoustic Markov Models for Words," RC 13099 (#58580) (Sep. 3, 1987), incorporated by reference herein. A hidden Markov model (HMM) for words, such as the well-known Bakis system, is obtained by the concatenation of phone HMMs. The HMM for a word is derived from a sample acoustic utterance. Typically, the number of states in an HMM corresponds to the average duration of the word in frames. For example, in the Bakis system, the frame size is 10 milliseconds and a typical word model has about 30 states. The direct path through the model, taking transitions that go directly from one state to the next, corresponds to an utterance of average duration. The self_loops allow portions of the word to be elongated while the transitions which skip every other state allow for temporal compression of portions of the word.

FIG. 6 illustrates hidden Markov model (HMM) phone topologies for each of the prioritized speech recognizers 310, 320, 330. The models 610 and 611 are linear HMMs with three states, two self loops and two transition arcs. Each self-loop or transition arc generates labels when the states that connect the arcs (or loops) are processed. The model 612 for the fast-rate speech speech recognizer 330 contains a skip arc between a first and third state. This allows the speech recognizer to jump from one state to another without generating labels. This process can be adequate for fast speech when some sounds are "swallowed." In other words, the present invention adds skip arcs to the model 612 (shown in FIG. 6 as dotted lines) to skip states in the path of the HMM. This allows the modeling of fast speech in which some phones are swallowed.

Figure 7:
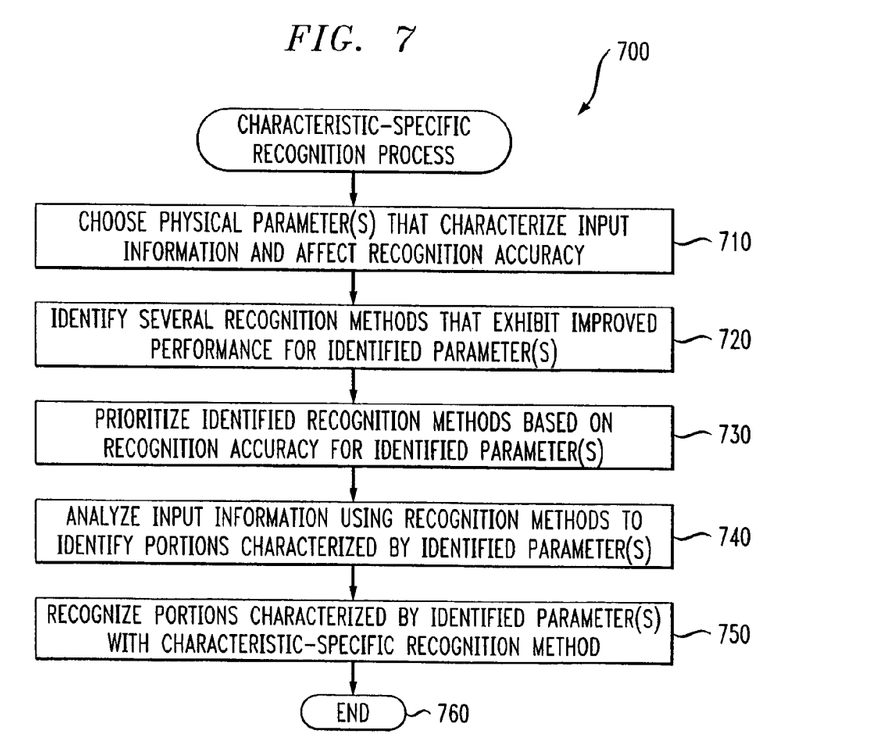
FIG. 7 is a flow chart describing a characteristic-specific recognition process in accordance with the present invention.

FIG. 7 is a flow chart describing a characteristic-specific recognition process 700 in accordance with the present invention. As shown in FIG. 7, the characteristic-specific recognition process 700 initially chooses a physical parameter(s) that characterizes input information and affects the recognition accuracy during step 710. During step 720, the characteristic-specific recognition process 700 identifies several recognition methods that exhibit improved performance for the parameter(s) identified in the previous step. Thereafter, the identified recognition methods are prioritized during step 730 based on the recognition accuracy for the identified parameter(s).

The input information, such as speech, is analyzed during step 740 using the identified recognition methods to identify portions of the input information that are characterized by the identified parameter(s), such as fast speech. Thereafter, the portions of the input information that are characterized by the identified parameter(s) are recognized during step 750 with the characteristic-specific recognition method 330, before program control terminates during step 760.

Speech feature vectors can be used to identify speaker characteristics and classes of speaker characteristics. For a further discussion of procedures that can be used to classify speech characteristics that can affect the speech accuracy, such as accent, gender or age, see, for example, U.S. Pat. No. 5,895,447, issued Apr. 20, 1999 and U.S. patent application Ser. No. 08/788,471, filed Jan. 28, 1997, entitled "Text Independent Speaker Recognition for Transparent Command Ambiguity Resolution and Continuous Access Control," each assigned to the assignee of the present invention and incorporated by reference herein.

As previously indicated, the characteristic-specific digitization system 100 may utilize an automatic speech recognition (ASR) system, an automatic handwriting recognition (AHR) system, an optical character recognition (OCR) system, an object recognition system or a machine translation (MT) system. In addition, the input information may be speech, handwriting, printed text, pictures or text in some language. Speech segments are recognized and output as strings of words in some format, such as ASCII, character segments are recognized and output as strings of characters in some format, such as ASCII, sub-areas of pictures are recognized and identified by the names of these sub-areas, and strings of words in a first language are recognized and output as strings of words in another language.

It is to be understood that the embodiments and variations shown and described herein are merely illustrative of the principles of this invention and that various modifications may be implemented by those skilled in the art without departing from the scope and spirit of the invention. For example, in an implementation where the digitization process 100 is converting handwriting to a computer-readable format, the parameters that affect recognition accuracy include stress, width, angle, speed, curvature and pressure. See, for example, V. Nalwa, "Automatic On_line Signature Verification," Biometrics Personal Identification in Network Society, edited by Anil Jain, Ruud Bolle, Sharath Pankanti, 143–64 (Kluwer Academic Publishers, Boston, 1999). Likewise, if the digitization process 100 is converting printed text to a computer-readable format using an OCR process, the parameters that affect recognition accuracy include fonts, contrast and letter width. In an implementation where the digitization process 100 is converting pictures to a computer-readable format, the parameters that affect recognition accuracy include color intensity, and the complexity of objects being recognized.

What is claimed is:

1. A system for digitizing input information from a first information type to a digital format, comprising:
   a memory that stores computer readable code; and
   a processor operatively coupled to said memory, said processor configured to:
   analyze said input information to determine if at least one of at least first and second characteristics is present, wherein said processor is further configured to:
      recognize said input information with a plurality of prioritized recognition methods that exhibit varying degrees of improved recognition for a certain characteristic of the input information; and
      determine whether a general recognizer or an intermediate recognizer produces a script closer to a reference output;
   select output information recognized with a first recognition method if said analyzing step determines that said input information includes said first characteristic; and
   select output information recognized with a second recognition method if said analyzing step determines that said input information includes said second characteristic.

2. A method for digitizing input information from a first information type to a digital format, said method comprising the steps of:
   analyzing said input information to determine if at least one of at least first and second characteristics is present, wherein said analyzing step further comprises the steps of:
      recognizing said input information with a plurality of prioritized recognition methods that exhibit varying degrees of improved recognition for a certain characteristic of the input information; and
      determining whether a general recognizer or an intermediate recognizer produces a script closer to a reference output;
   selecting output information recognized with a first recognition method if said analyzing step determines that said input information includes said first characteristic; and
   selecting output information recognized with a second recognition method if said analyzing step determines that said input information includes said second characteristic.

3. The method of claim 2, wherein said reference output is produced by a characteristic-specific recognizer.

4. The method of claim 2, wherein said reference output is obtained using a voting method.

5. The method of claim 2, wherein said input information type is speech.

6. The method of claim 2, wherein said input information type is handwriting.

7. The method of claim 2, wherein said input information type is printed text.

8. The method of claim 2, wherein said input information type is pictures.

9. A method for digitizing input information from a first information type to a digital format, said method comprising the steps of:
   identifying portions of said input information having a characteristic that impairs recognition accuracy with a plurality of prioritized recognition methods that exhibit varying degrees of improved recognition for said characteristic and determining whether a general recognizer or an intermediate recognizer produces a script closer to a reference output; and recognizing said input information portions with a recognizer that exhibits improved performance for said characteristic.

10. A system for digitizing input information from a first information type to a digital format, comprising:
a memory that stores computer readable code; and
a processor operatively coupled to said memory, said processor configured to:
identify portions of said input information having a characteristic that impairs recognition accuracy with a plurality of prioritized recognition methods that exhibit varying degrees of improved recognition for said characteristic and determining whether a general recognizer or an intermediate recognizer produces a script closer to a reference script; and
recognize said input information portions with a recognizer that exhibits improved performance for said characteristic.

11. A method for transcribing speech, said method comprising the steps of:
analyzing a speech sample to determine if at least one of at least first and second types of speech is present, wherein said analyzing step further comprises the steps of:
recognizing said speech with a plurality of prioritized speech recognition methods that exhibit varying degrees of improved speech recognition for a certain characteristic of the input speech; and
determining whether a general speech recognizer or an intermediate speech recognizer produces a script closer to a reference script;
selecting speech recognized with a first speech recognition method if said analyzing step determines that said speech sample includes said first type of speech; and
selecting speech recognized with a second speech recognition method if said analyzing step determines that said speech sample includes said second type of speech.

12. The method of claim 11, further comprising the step of generating an index of said speech samples with said first type of speech and an index of said speech samples with said second type of speech.

13. The method of claim 12, wherein said index is obtained using a voting method.

14. The method of claim 11, wherein said first type of speech is fast rate speech and said second type of speech is normal rate speech.

15. The method of claim 11, wherein said first type of speech is speech with background noise and said second type of speech is speech without background noise.

16. A system for transcribing speech, comprising:
a memory that stores computer readable code; and
a processor operatively coupled to said memory, said processor configured to:
analyze a speech sample to determine if at least one of at least first and second types of speech is present, wherein said processor is further configured to:
recognize said speech with a plurality of prioritized speech recognition methods that exhibit varying degrees of improved speech recognition for a certain characteristic of the input speech; and
determine whether a general speech recognizer or an intermediate speech recognizer produces a script closer to a reference script;
select speech recognized with a first speech recognition method if said analyzing step determines that said speech sample includes said first type of speech; and
select speech recognized with a second speech recognition method if said analyzing step determines that said speech sample includes said second type of speech.

17. A method for transcribing speech, said method comprising the steps of:
identifying portions of said speech having a characteristic that impairs speech recognition accuracy with a plurality of prioritized speech recognition methods that exhibit varying degrees of improved speech recognition for a certain characteristic of the input speech and determining whether a general speech recognizer or an intermediate speech recognizer produces a script closer to a reference script; and
recognizing said identified speech portions with a speech recognizer that exhibits improved performance for said characteristic.

18. The method of claim 17, further comprising the step of generating an index of said speech having said characteristic that impairs speech recognition accuracy and an index of said speech not having said characteristic that impairs speech recognition accuracy.

19. The method of claim 17, wherein said characteristic that impairs speech recognition accuracy is speech with background noise.

20. The method of claim 17, wherein said characteristic that impairs speech recognition accuracy is a speech rate that is faster than a normal speech rate.

21. A system for transcribing speech, comprising:
a memory that stores computer readable code; and
a processor operatively coupled to said memory, said processor configured to:
identify portions of said speech having a characteristic that impairs speech recognition accuracy with a plurality of prioritized speech recognition methods that exhibit varying degrees of improved speech recognition for a certain characteristic of the input speech and determining whether a general speech recognizer or an intermediate speech recognizer produces a script closer to a reference script; and
recognize said identified speech portions with a speech recognizer that exhibits improved performance for said characteristic.

22. A method for transcribing speech, said method comprising the steps of:
recognizing a speech sample with at least three speech recognition methods that are prioritized according to performance for a given characteristic of input speech, at least one of said speech recognition methods producing a reference script;
comparing said recognized speech samples with said reference script to identify portions of said speech having a characteristic that impairs speech recognition accuracy; and
selecting speech portions recognized with a speech recognizer that exhibits improved performance for said characteristic relative to a general speech recognizer.

23. The method of claim 22, further comprising the step of generating an index of said speech having said characteristic that impairs speech recognition accuracy and an index of said speech not having said characteristic that impairs speech recognition accuracy.

24. The method of claim 22, wherein said characteristic that impairs speech recognition accuracy is a speech rate that is faster than a normal speech rate.

25. The method of claim 22, wherein said characteristic that impairs speech recognition accuracy is speech with background noise.

26. A system for transcribing speech, comprising:
- a memory that stores computer readable code; and
- a processor operatively coupled to said memory, said processor configured to:
- recognize a speech sample with at least three speech recognition methods that are prioritized according to performance for a given characteristic of input speech, at least one of said speech recognition methods producing a reference script;
- compare said recognized speech samples with said reference script to identify portions of said speech having a characteristic that impairs speech recognition accuracy; and
- select speech portions recognized with a speech recognizer that exhibits improved performance for said characteristic relative to a general speech recognizer.

27. An article of manufacture for digitizing input information from a first information type to a digital format, comprising:
- a step to analyze said input information to determine if at least one of at least first and second types of information is present, wherein said step to analyze further comprises the steps of:
  - a step to recognize said input information with a plurality of prioritized recognition methods that exhibit varying degrees of improved recognition for a certain characteristic of the input information; and
  - a step to determine whether a general recognizer or an intermediate recognizer produces a script closer to a reference output;
- a step to select output information recognized with a first recognition method if said analyzing step determines that said input information includes said first characteristic; and
- a step to select output information recognized with a second recognition method if said analyzing step determines that said input information includes said second characteristic.

28. An article of manufacture for digitizing input information from a first information type to a digital format, comprising:
- a step to identify portions of said input information having a characteristic that impairs recognition accuracy with a plurality of prioritized recognition methods that exhibit varying degrees of improved recognition for said characteristic and determining whether a general recognizer or an intermediate recognizer produces a script closer to a reference script; and
- a step to recognize said input information portions with a recognizer that exhibits improved performance for said characteristic.

29. An article of manufacture for transcribing speech, comprising:
- a step to analyze a speech sample to determine if at least one of at least first and second types of speech is present, wherein said step to analyze further comprises the steps of:
  - a step to recognize said speech with a plurality of prioritized speech recognition methods that exhibit varying degrees of improved speech recognition for a certain characteristic of the input speech; and
  - a step to determine whether a general speech recognizer or an intermediate speech recognizer produces a script closer to a reference script;
- a step to select speech recognized with a first speech recognition method if said analyzing step determines that said speech sample includes said first type of speech; and
- a step to select speech recognized with a second speech recognition method if said analyzing step determines that said speech sample includes said second type of speech.

30. An article of manufacture for transcribing speech, comprising:
- a step to identify portions of said speech having a characteristic that impairs speech recognition accuracy with a plurality of prioritized speech recognition methods that exhibit varying degrees of improved speech recognition for a certain characteristic of the input speech and determining whether a general speech recognizer or an intermediate speech recognizer produces a script closer to a reference script; and
- a step to recognize said identified speech portions with a speech recognizer that exhibits improved performance for said characteristic.

* * * * *